US012664294B2

(12) United States Patent
Jiménez et al.

(10) Patent No.: US 12,664,294 B2
(45) Date of Patent: Jun. 23, 2026

(54) CONTROL OF ACCESS TO RESOURCES OF DATA OBJECTS

(71) Applicant: Telefonaktiebolaget LM Ericsson (publ), Stockholm (SE)

(72) Inventors: Jaime Jiménez, Espoo (FI); Ari Keränen, Helsinki (FI); Mert Ocak, Helsinki (FI); Gonzalo Camarillo Gonzalez, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 260 days.

(21) Appl. No.: 17/910,696

(22) PCT Filed: Mar. 11, 2020

(86) PCT No.: PCT/EP2020/056522
§ 371 (c)(1),
(2) Date: Sep. 9, 2022

(87) PCT Pub. No.: WO2021/180316
PCT Pub. Date: Sep. 16, 2021

(65) Prior Publication Data
US 2023/0133840 A1 May 4, 2023

(51) Int. Cl.
*H04L 9/40* (2022.01)
*G06F 21/55* (2013.01)
*G06F 21/62* (2013.01)

(52) U.S. Cl.
CPC ........ *G06F 21/6218* (2013.01); *G06F 21/554* (2013.01); *G06F 2221/034* (2013.01)

(58) Field of Classification Search
None
See application file for complete search history.

(56) References Cited

U.S. PATENT DOCUMENTS 10,445,393 B2 * 10/2019 Raymond ........... G06F 16/9566
10,853,378 B1 * 12/2020 Campbell ........... G06F 16/2458
(Continued)

OTHER PUBLICATIONS

International Search Report and Written Opinion dated Dec. 21, 2020 in International Application No. PCT/EP2020/056522 (18 pages).

(Continued)

*Primary Examiner* — Trang T Doan
(74) *Attorney, Agent, or Firm* — Rothwell, Figg, Ernst & Manbeck, P.C.

(57) ABSTRACT

Nodes and methods for controlling access to resources of data objects exposed by at least one computing device is disclosed. The data objects conform to an object model that specifies, for a given object name of a data object, one or more resources which may be associated with instances of a data object of that object name. An access control node is configured to receive a request to access a resource of a data object instance (110), determine a compatibility of the request with an access rule (120) and perform at least one of allowing or denying the request in accordance with the determined compatibility (130). The request to access a resource of the data object instance identifies the resource at an identification abstraction level that specifies how the resource may be accessed, and the access rule specifies one or more limitations on access to resources at a semantic abstraction level that indicates a semantic content of a data object or resource. Determining a compatibility of the request with an access rule comprises using a mapping between the identification abstraction level and the semantic abstraction level (120a).

19 Claims, 12 Drawing Sheets

(56)            References Cited

U.S. PATENT DOCUMENTS

| | | | |
|---|---|---|---|
| 2010/0287158 A1* | 11/2010 | Toledano | G06F 21/6218 |
| | | | 726/13 |
| 2015/0215323 A1* | 7/2015 | Grigoriev | G06F 16/36 |
| | | | 726/12 |
| 2015/0227618 A1 | 8/2015 | Dong et al. | |
| 2016/0021064 A1* | 1/2016 | Lock | H04L 63/0428 |
| | | | 726/26 |
| 2020/0082106 A1* | 3/2020 | Fox | H04L 63/083 |
| 2020/0349130 A1* | 11/2020 | Bracholdt | G06F 16/254 |
| 2021/0064769 A1* | 3/2021 | Yu | G06F 21/6227 |

OTHER PUBLICATIONS

OMA SpecWorks, "Lightweight Machine to Machine Technical Specification: Core", Jul. 10, 2018, Open Mobile Alliance, OMA-TS-LightweightM2M_Core-V1_1-20180710-A (142 pages).
Shelby, Z. et al., "The Constrained Application Protocol (CoAP)", Jun. 2014, Internet Engineering Task Force (IETF), Request for Comments: 7252, Category: Standards Track, ISSN: 2070-1721 (112 pages).

* cited by examiner

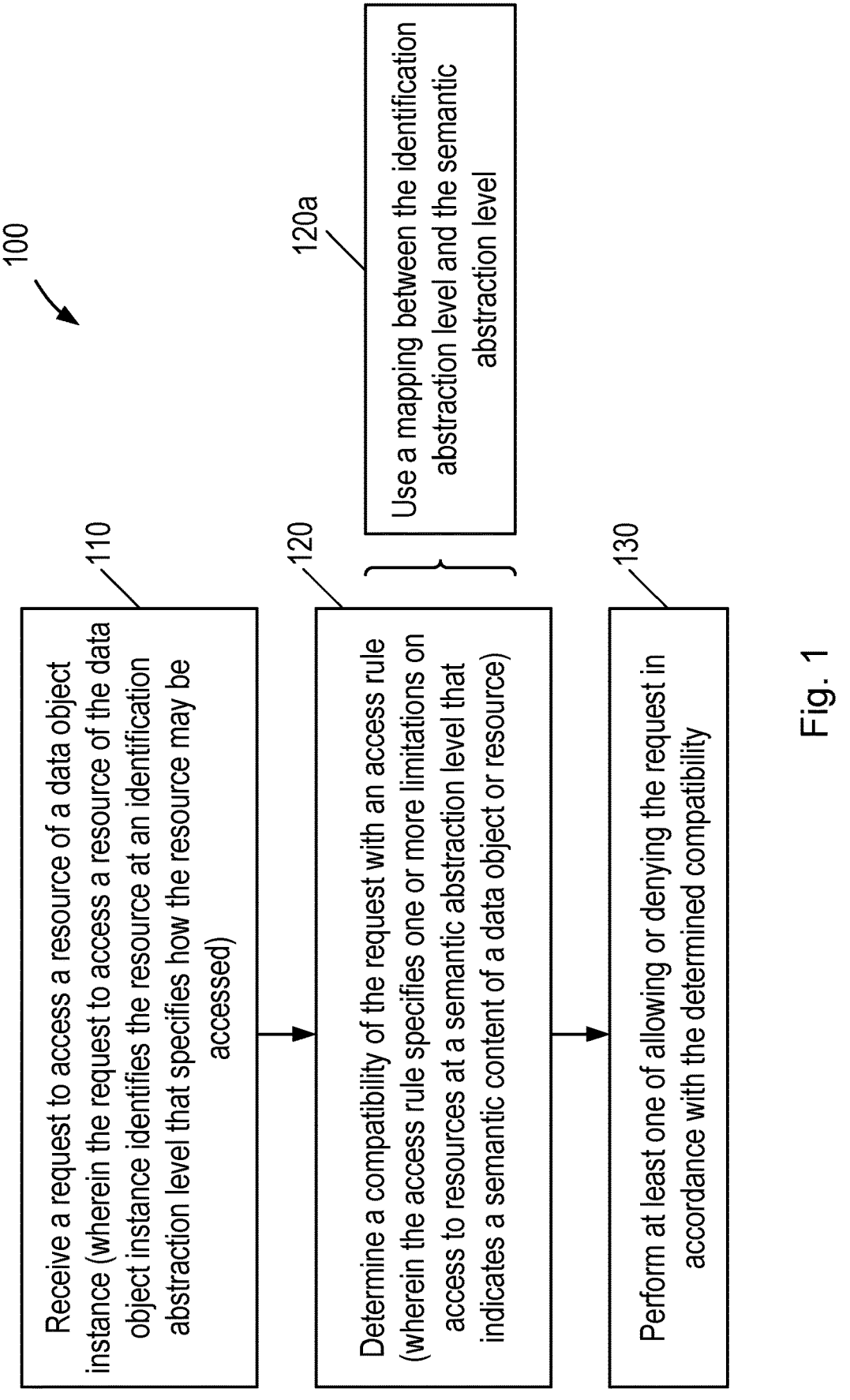

100

110

Receive a request to access a resource of a data object instance (wherein the request to access a resource of the data object instance identifies the resource at an identification abstraction level that specifies how the resource may be accessed)

120

Determine a compatibility of the request with an access rule (wherein the access rule specifies one or more limitations on access to resources at a semantic abstraction level that indicates a semantic content of a data object or resource)

120a

Use a mapping between the identification abstraction level and the semantic abstraction level

130

Perform at least one of allowing or denying the request in accordance with the determined compatibility

Fig. 1

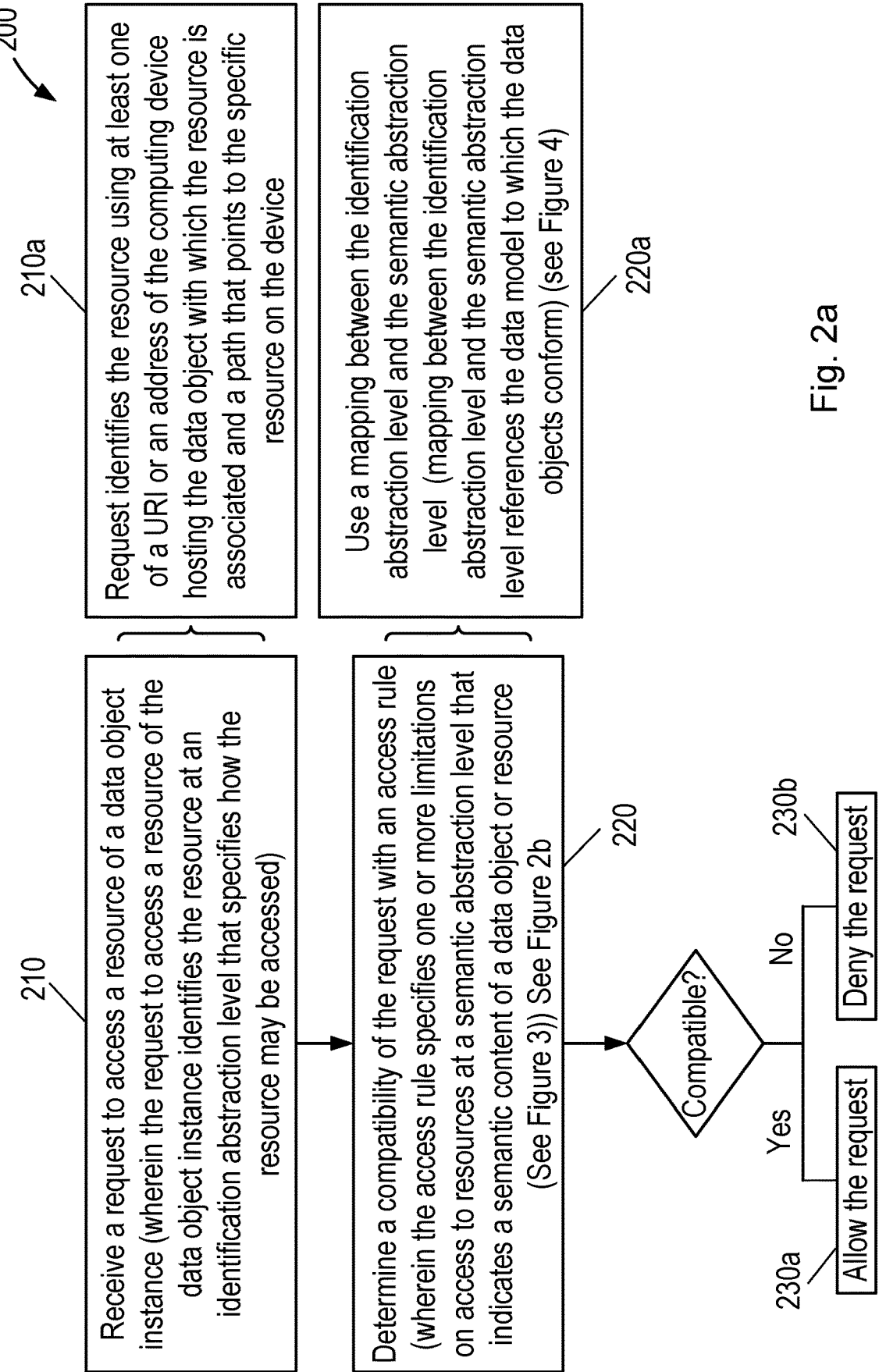

Receive a request to access a resource of a data object instance (wherein the request to access a resource of the data object instance identifies the resource at an identification abstraction level that specifies how the resource may be accessed)

210a

Request identifies the resource using at least one of a URI or an address of the computing device hosting the data object with which the resource is associated and a path that points to the specific resource on the device

220

Determine a compatibility of the request with an access rule (wherein the access rule specifies one or more limitations on access to resources at a semantic abstraction level that indicates a semantic content of a data object or resource (See Figure 3)) See Figure 2b 220a Use a mapping between the identification abstraction level and the semantic abstraction level  (mapping between the identification abstraction level and the semantic abstraction level references the data model to which the data objects conform) (see Figure 4)

Compatible?

Yes          No 230a          230b

Allow the request          Deny the request

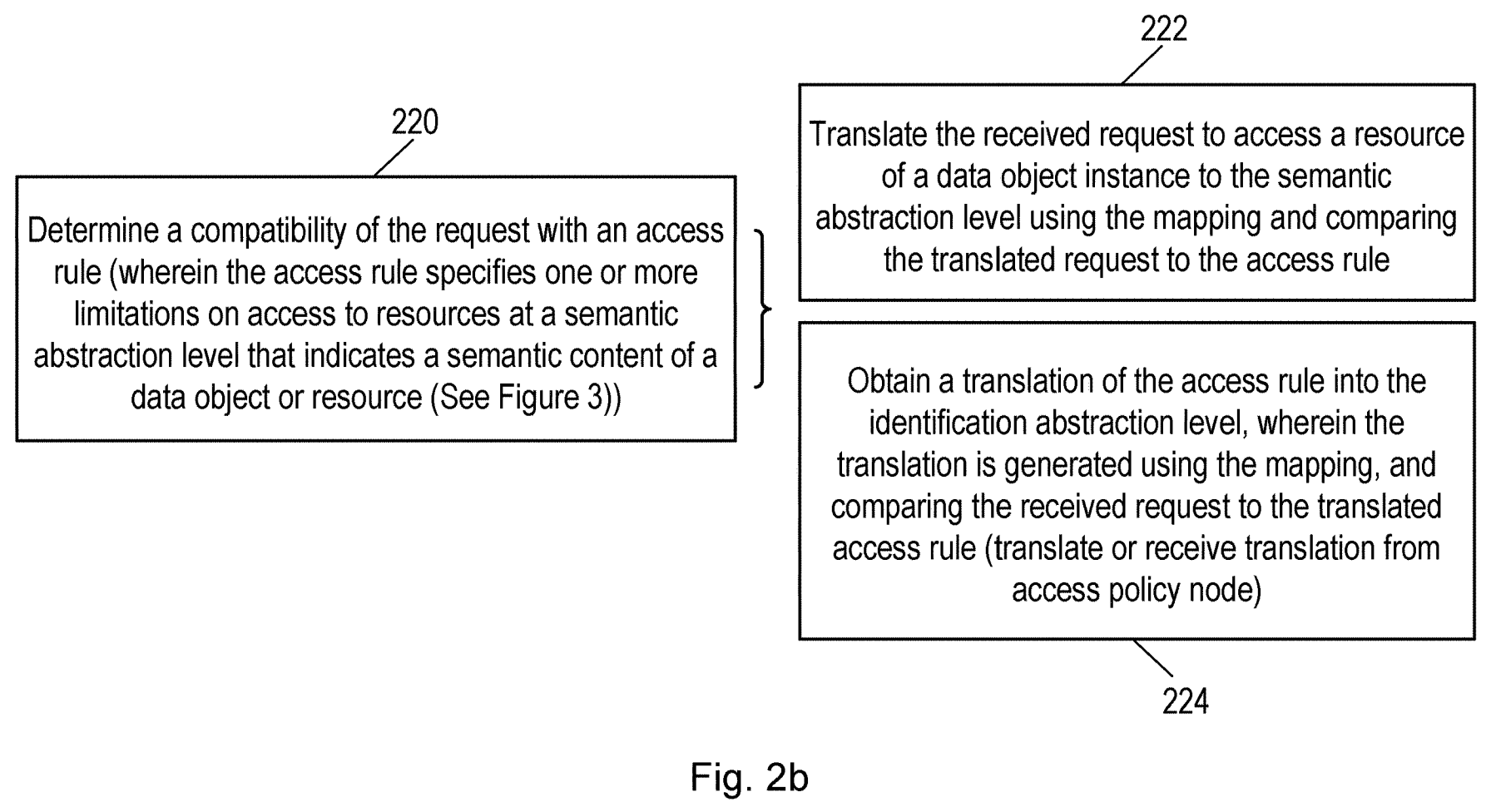

222

Translate the received request to access a resource of a data object instance to the semantic abstraction level using the mapping and comparing the translated request to the access rule

224

Obtain a translation of the access rule into the identification abstraction level, wherein the translation is generated using the mapping, and comparing the received request to the translated access rule (translate or receive translation from access policy node)

220

Determine a compatibility of the request with an access rule (wherein the access rule specifies one or more limitations on access to resources at a semantic abstraction level that indicates a semantic content of a data object or resource (See Figure 3))

Fig. 2b

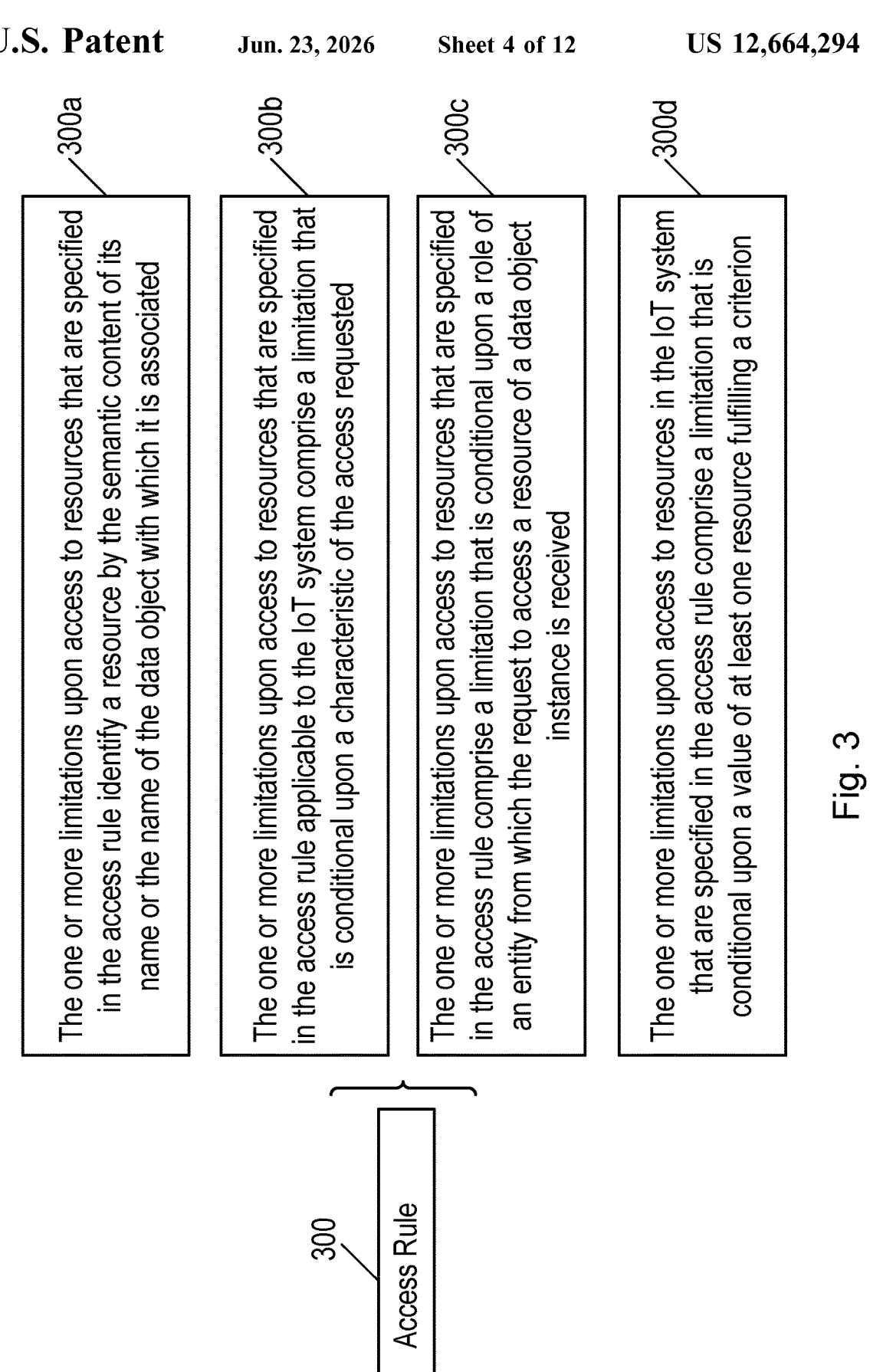

300a

The one or more limitations upon access to resources that are specified in the access rule identify a resource by the semantic content of its name or the name of the data object with which it is associated 300b The one or more limitations upon access to resources that are specified in the access rule applicable to the IoT system comprise a limitation that is conditional upon a characteristic of the access requested 300c The one or more limitations upon access to resources that are specified in the access rule comprise a limitation that is conditional upon a role of an entity from which the request to access a resource of a data object instance is received 300d The one or more limitations upon access to resources in the IoT system that are specified in the access rule comprise a limitation that is conditional upon a value of at least one resource fulfilling a criterion

300

Access Rule

Fig. 3

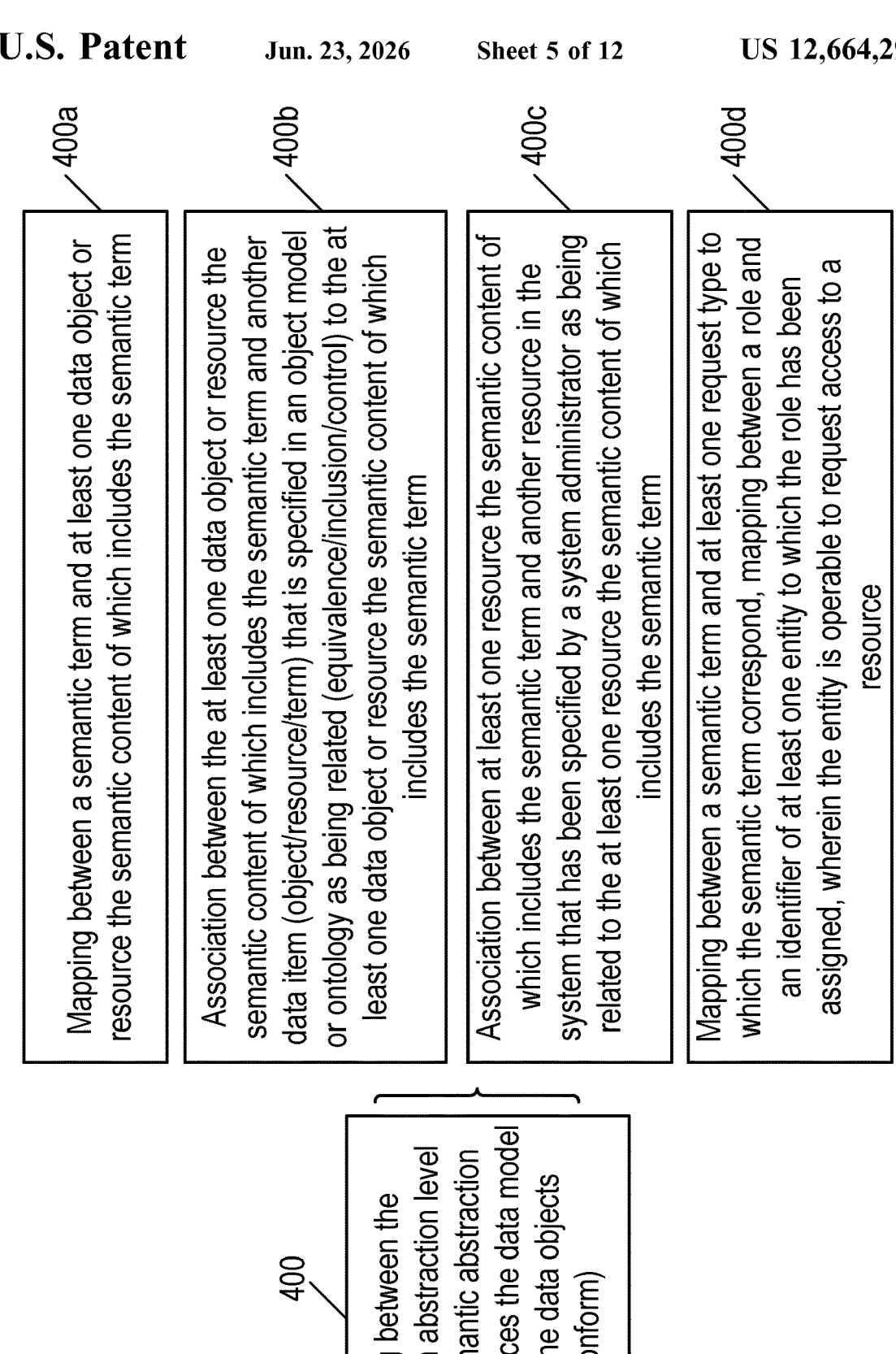

400a

Mapping between a semantic term and at least one data object or resource the semantic content of which includes the semantic term 400b Association between the at least one data object or resource the semantic content of which includes the semantic term and another data item (object/resource/term) that is specified in an object model or ontology as being related (equivalence/inclusion/control) to the at least one data object or resource the semantic content of which includes the semantic term 400c Association between at least one resource the semantic content of which includes the semantic term and another resource in the system that has been specified by a system administrator as being related to the at least one resource the semantic content of which includes the semantic term 400d Mapping between a semantic term and at least one request type to which the semantic term correspond, mapping between a role and an identifier of at least one entity to which the role has been assigned, wherein the entity is operable to request access to a resource

400

Mapping between the identification abstraction level and the semantic abstraction level (references the data model to which the data objects conform)

Receive configuration information defining an access rule, wherein the access rule specifies one or more limitations upon access to resources at a semantic abstraction level that indicates a semantic content of a data object or resource

520

Store the access rule in a memory

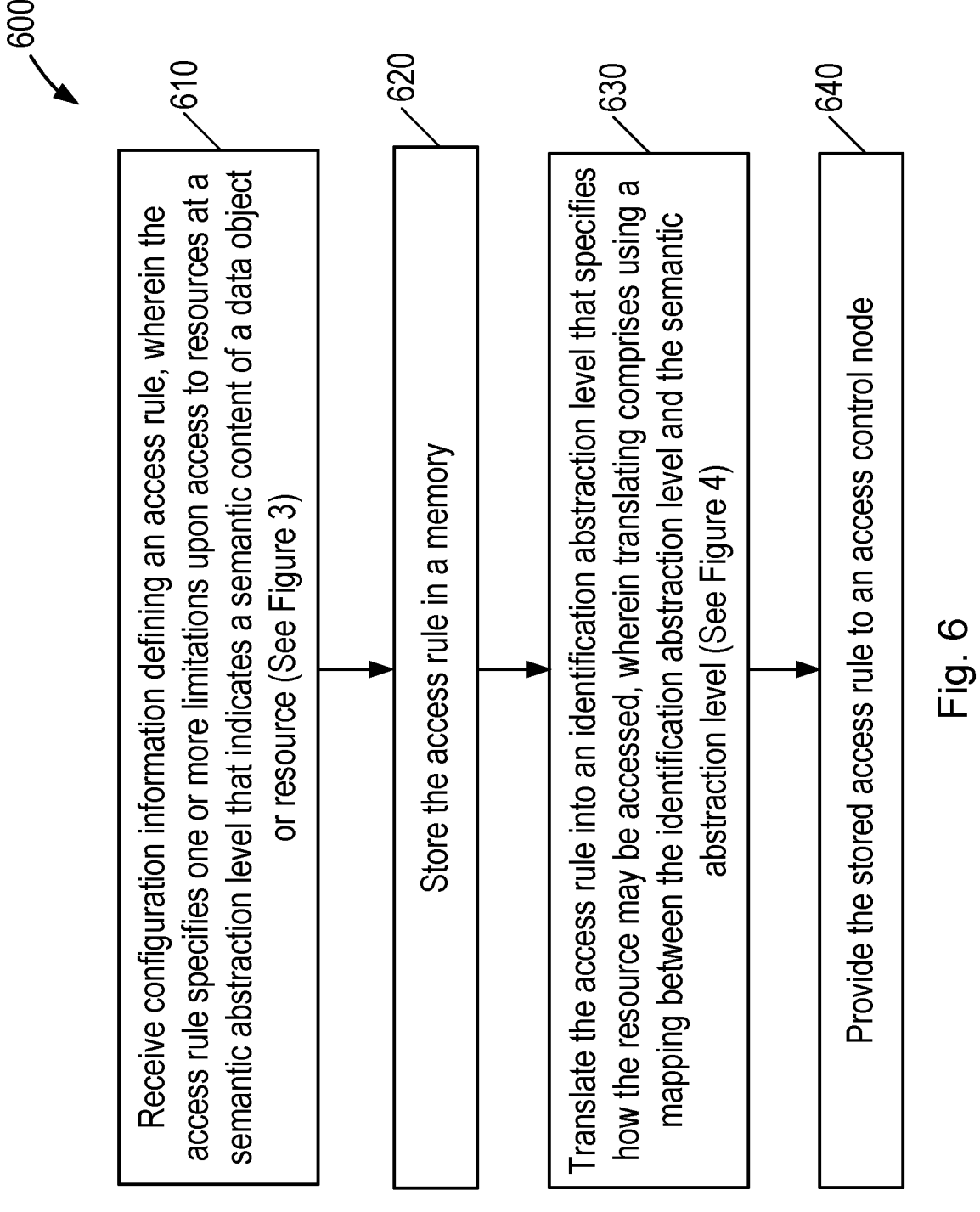

600

610

Receive configuration information defining an access rule, wherein the access rule specifies one or more limitations upon access to resources at a semantic abstraction level that indicates a semantic content of a data object or resource (See Figure 3)

620

Store the access rule in a memory

630

Translate the access rule into an identification abstraction level that specifies how the resource may be accessed, wherein translating comprises using a mapping between the identification abstraction level and the semantic abstraction level (See Figure 4)

640

Provide the stored access rule to an access control node

Fig. 6

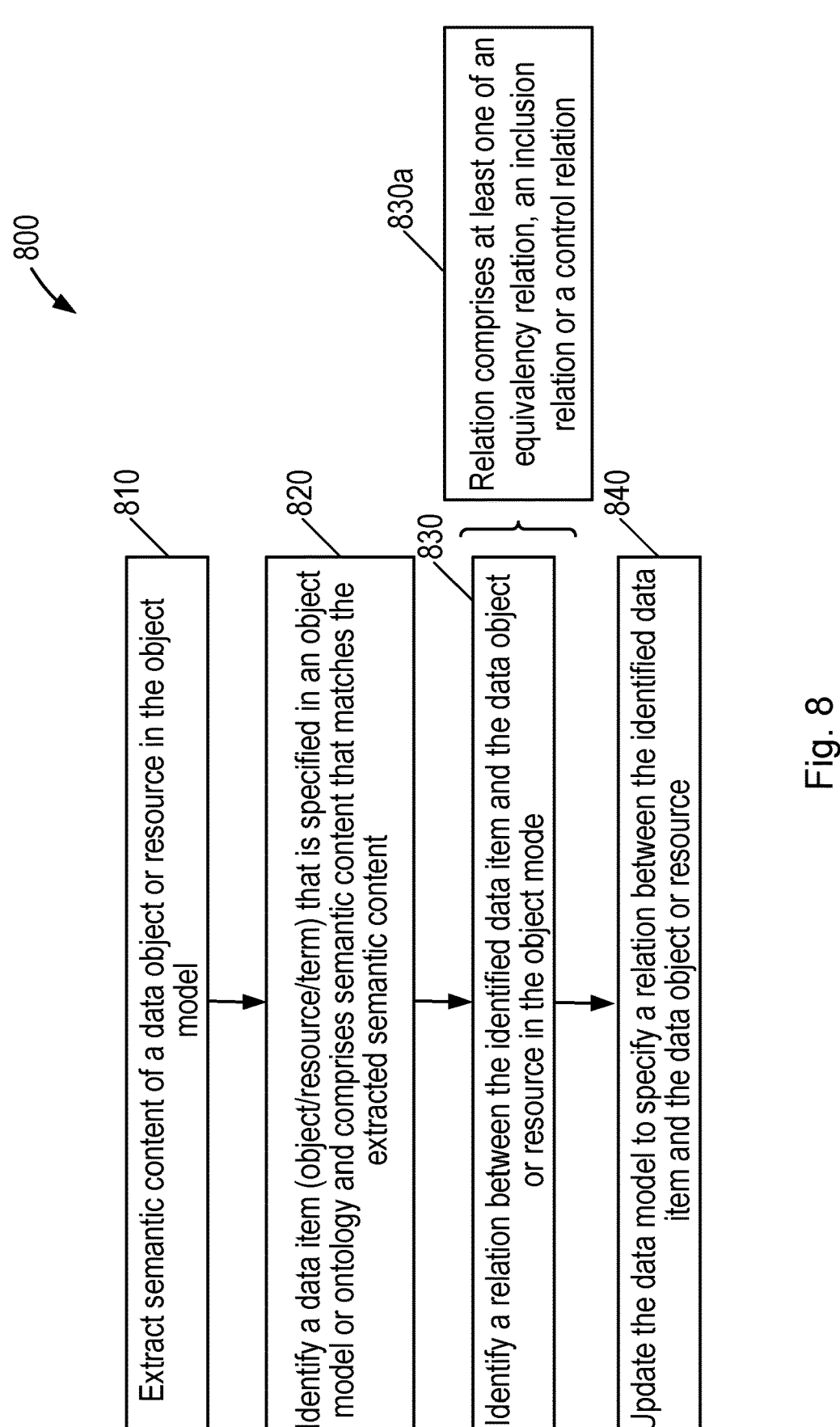

800

810 — Extract semantic content of a data object or resource in the object model

820 — Identify a data item (object/resource/term) that is specified in an object model or ontology and comprises semantic content that matches the extracted semantic content 830 — Identify a relation between the identified data item and the data object or resource in the object mode 830a — Relation comprises at least one of an equivalency relation, an inclusion relation or a control relation 840 — Update the data model to specify a relation between the identified data item and the data object or resource

CONTROL OF ACCESS TO RESOURCES OF DATA OBJECTS

CROSS REFERENCE TO RELATED APPLICATIONS

This application is a 35 U.S.C. § 371 National Stage of International Patent Application No. PCT/EP2020/056522, filed Mar. 11, 2020.

TECHNICAL FIELD

The present disclosure relates to nodes an access control node for controlling access to resources of data objects exposed by at least one computing device, an access policy node for managing access rules for controlling access to resources of data objects hosted on at least one computing device, an object model node for maintaining an object model, corresponding methods, corresponding computer programs, corresponding computer program products, and corresponding carriers.

BACKGROUND

Networked systems are usually required to control access to resources within the system, and firewalls are the most commonly used tool for implementing such control. Firewalls are typically configured with rules that identify traffic flows based on IP addresses and port numbers. For example, a rule may state that traffic from a set of external source IP addresses should not be forwarded to another set of internal destination IP addresses. While standard firewalls provide a useful way to implement rule-based traffic filtering, their rules are typically not sufficiently flexible to implement more advanced access control policies. This can be particularly problematic in systems based on the Internet of Things (IoT).

IoT refers to devices enabled for communication network connectivity, so that these devices may be remotely managed, and data collected or required by the devices may be exchanged between individual devices and between devices and application servers. Such devices, examples of which may include sensors and actuators, are often, although not necessarily, subject to limitations on processing power, storage capacity, energy supply, device complexity and/or network connectivity, imposed by their operating environment or situation, and may consequently be referred to as constrained devices. Standard firewalls do not provide a complete solution for implementing access control in IoT systems. Firewalls provide only limited flexibility, and their use in IoT systems results in cumbersome and impractical configuration processes.

Intrusion Prevention Systems (IPS) and Intrusion Detection Systems (IDS), including those based on Deep Packet Inspection (DPI), provide greater flexibility for the identification of traffic flows when implementing access control for a networked system. In addition to using IP addresses and port numbers, IPSs can inspect the payload of the application-layer protocol used to access a resource. Rules based on these payloads can express more complex and flexible policies than those implemented by standard firewalls. Existing IPSs are designed for use with application-layer protocols that are commonly used to implement human-to-machine interactions such as web browsing. A typical example protocol is HTTP. Many IoT devices however use protocols developed for use in constrained devices and environments, including for example Lightweight Machine to Machine (LwM2M) and IPSO smart objects for applications. Existing IPSs, being designed to work with traffic such as web browsing that involves human interaction, as opposed to Machine to Machine interaction, do not support these application-layer protocols which are commonly used in IoT systems.

Role-based access control systems allow the configuration of system access using a higher level of abstraction than when using typical user-based authorization. A role can be assigned to a human user or to an entity such as an actuator that may seek to access a resource. A user-based authorization system may for example have to be configured with the URIs of resources in a system for which access is controlled, paired with user or entity identifiers for all users or entities allowed to perform a certain action on those resources. For example, identities of all users who should be authorized to read a sensor in an IoT deployment may be paired with the URI of the sensor, or identities of all devices authorized to instruct closing or opening of a valve in a smart factory may be paired with the URI of the valve. Using roles, the system could be configured to allow all users or entities with a given role (e.g., "administrator") to perform that action. While role-based authorisation allows for simplified access configuration for entities or users seeking to access a resource, resources themselves must still be configured individually. For example, an IPS may have to be configured with the URIs of all the endpoints of a given type in a system (for example, actuators on door locks) in order to be able to allow authorized access, and block unauthorized access attempts.

SUMMARY

It is an aim of the present disclosure to provide nodes, methods and a computer readable medium which at least partially address one or more of the challenges discussed above.

According to a first aspect of the present disclosure, there is provided an access control node for controlling access to resources of data objects exposed by at least one computing device. The data objects conform to an object model that specifies, for a given object name of a data object, one or more resources which may be associated with instances of a data object of that object name. The access control node comprises processing circuitry configured to receive a request to access a resource of a data object instance, to determine a compatibility of the request with an access rule, and to perform at least one of allowing or denying the request in accordance with the determined compatibility. The request to access a resource of the data object instance identifies the resource at an identification abstraction level that specifies how the resource may be accessed, and the access rule specifies one or more limitations on access to resources at a semantic abstraction level that indicates a semantic content of a data object or resource. According to the first aspect of the present disclosure, determining a compatibility of the request with an access rule comprises using a mapping between the identification abstraction level and the semantic abstraction level.

According to a second aspect of the present disclosure, there is provided an access policy node for managing access rules for controlling access to resources of data objects hosted on at least one computing device. The data objects conform to an object model that specifies, for a given object name of a data object, one or more resources which may be associated with instances of a data object of that object name. The access policy node comprises processing circuitry configured to receive configuration information defining an access rule and store the access rule in a memory. The access rule specifies one or more limitations upon access to resources at a semantic abstraction level that indicates a semantic content of a data object or resource.

According to a third aspect of the present disclosure, there is provided an object model node for maintaining an object model that specifies, for a given object name of a data object, one or more resources which may be associated with instances of a data object of that object name. The object model node comprises processing circuitry configured to extract semantic content of a data object or resource in the object model, and to identify a data item that is specified in an object model or ontology and comprises semantic content that matches the extracted semantic content. The processing circuitry is further configured to identify a relation between the identified data item and the data object or resource in the object model, and to update the data model to specify a relation between the identified data item and the data object or resource.

According to a fourth aspect of the present disclosure, there is provided a method for controlling access to resources of data objects exposed by at least one computing device. The data objects conform to an object model that specifies, for a given object name of a data object, one or more resources which may be associated with instances of a data object of that object name. The method is performed by an access control node and comprises receiving a request to access a resource of a data object instance and determining a compatibility of the request with an access rule. The method further comprises performing at least one of allowing or denying the request in accordance with the determined compatibility. The request to access a resource of the data object instance identifies the resource at an identification abstraction level that specifies how the resource may be accessed. The access rule specifies one or more limitations on access to resources at a semantic abstraction level that indicates a semantic content of a data object or resource. According to the method, determining a compatibility of the request with an access rule comprises using a mapping between the identification abstraction level and the semantic abstraction level.

According to a fifth aspect of the present disclosure, there is provided a method for managing access rules for controlling access to resources of data objects hosted on at least one computing device. The data objects conform to an object model that specifies, for a given object name of a data object, one or more resources which may be associated with instances of a data object of that object name. The method, performed by an access policy node, comprises receiving configuration information defining an access rule, and storing the access rule in a memory. The access rule specifies one or more limitations upon access to resources at a semantic abstraction level that indicates a semantic content of a data object or resource.

According to a sixth aspect of the present disclosure, there is provided a method for maintaining an object model that specifies, for a given object name of a data object, one or more resources which may be associated with instances of a data object of that object name. The method, performed by an object model node, comprises extracting semantic content of a data object or resource in the object model and identifying a data item that is specified in an object model or ontology and comprises semantic content that matches the extracted semantic content. The method further comprises identifying a relation between the identified data item and the data object or resource in the object mode, and updating the data model to specify a relation between the identified data item and the data object or resource.

According to a seventh aspect of the present disclosure, there is provided a computer program comprising instructions which, when executed on at least one processor, cause the at least one processor to carry out a method according an embodiment of the fourth, fifth, or sixth, aspect of the present disclosure.

According to an eight aspect of the present disclosure, there is provided a carrier containing a computer program according to an embodiment of the seventh aspect of the present disclosure, wherein the carrier comprises one of an electronic signal, optical signal, radio signal or computer readable storage medium.

According to a ninth aspect of the present disclosure, there is provided a computer program product comprising non transitory computer readable media having stored thereon a computer program according to an embodiment of the seventh aspect of the present disclosure.

BRIEF DESCRIPTION OF THE DRAWINGS

For a better understanding of the present disclosure, and to show more clearly how it may be carried into effect, reference will now be made, by way of example, to the following drawings in which:

FIG. 1 is a flow chart illustrating process steps in a method for controlling access to resources of data objects exposed by at least one computing device;

FIGS. 2a and 2b show a flow chart illustrating process steps in another example of method for controlling access to resources of data objects exposed by at least one computing device;

FIG. 3 illustrates characteristics that may be exhibited by an access rule;

FIG. 4 illustrates characteristics that may be exhibited by a mapping between a semantic abstraction level and an identification abstraction level;

FIG. 6 is a flow chart illustrating process steps in another example of method for managing access rules for controlling access to resources of data objects hosted on at least one computing device

FIG. 8 is a flow chart illustrating process steps in a method for maintaining an object model;

DETAILED DESCRIPTION

Figure 5:
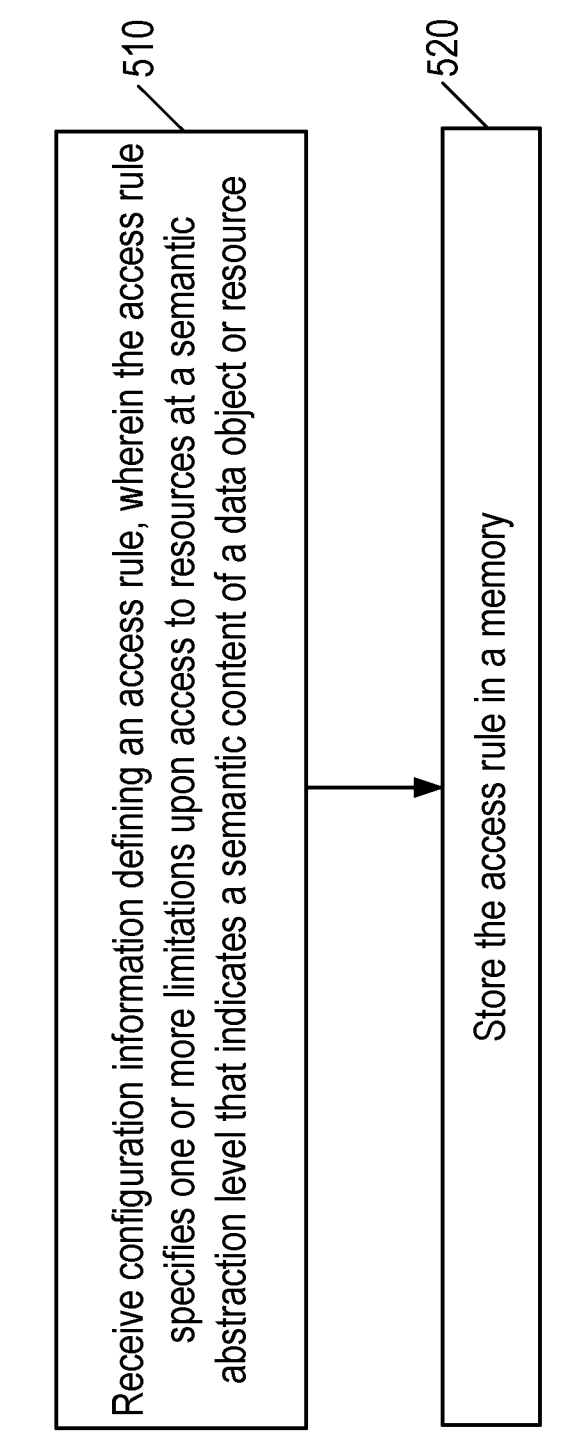
FIG. 5 is a flow chart illustrating process steps in a method for managing access rules for controlling access to resources of data objects hosted on at least one computing device.

Aspects of the present disclosure provide nodes, and methods performed by such nodes, which enable access to resources to be specified at a higher level of abstraction than addresses and port numbers. Aspects of the present disclosure thus both simplify the configuration of access to resources, and offer greater flexibility and functionality in the control of access to resources. Aspects of the present disclosure may be applied to resources within any system, but may be particularly advantageous when deployed in an IoT system.

The functionality of an IoT device can be described to other devices, management servers, application servers and any other entities or functions using an object model that describes the capabilities of the device, and how to interact with them. An object model specifies, for a given object name of a data object, one or more resources which may be associated with instances of a data object of that object name. If a device is using the Open Mobile Alliance Lightweight Machine to Machine (LwM2M) framework, the device may be referred to as a LwM2M client with "Smart Objects", and its capabilities may be referred to as "Resources". An IPSO Smart Object is a specified collection of reusable resources that has a defined object identifier and which represents a particular type of physical sensor, actuator, connected object or other data source. Each resource associated with a device is named using a unique Uniform Resource Identifier (URI) that can be used to address the resource by any function that seeks to invoke the resource in some way.

Aspects and examples of the present disclosure exploit the semantic content of data objects specified in an object model, in order to enable the specification of access control rules at a semantic abstraction level. The specification of a rule at a semantic level may apply to the resources covered by the rule and may also apply to a characteristic of the access that is requested. For example, a given endpoint may be allowed only to read values related to temperature. Another endpoint may be prevented from writing anything to resources of a "door lock" type. Some examples of the present disclosure may additionally exploit relational information between resources or objects, thus enabling automation of rules across different objects. The relational information may for example be based on resource or object type or on control aspects relating to hierarchical relations between resources.

FIG. 1 is a flow chart illustrating process steps in a method 100 for controlling access to resources of data objects exposed by at least one computing device. The data objects conform to an object model that specifies, for a given object name of a data object, one or more resources which may be associated with instances of a data object of that object name. The method 100 is performed by an access control node, which may be a physical node or a virtual node running in a cloud, edge cloud or fog deployment. The access control node may for example be a component part of an Intrusion Prevention System. Referring to FIG. 1, the method 100 comprises, in a first step 110, receiving a request to access a resource of a data object instance. In step 120, the access control node determines a compatibility of the request with an access rule, and, in step 130, the access control node performs at least one of allowing or denying the request in accordance with the determined compatibility. As illustrated at step 110, the request to access a resource of the data object instance identifies the resource at an identification abstraction level that specifies how the resource may be accessed. This may for example comprise including in the request a URI of the resource. As illustrated at step 120, the access rule specifies one or more limitations on access to resources at a semantic abstraction level that indicates a semantic content of a data object or resource. As illustrated at step 120*a*, determining a compatibility of the request with an access rule comprises using a mapping between the identification abstraction level and the semantic abstraction level. According to different examples of the present disclosure, the mapping may be used to convert the access request to the semantic abstraction level, or the access rule to the identification abstraction level, so as to enable a comparison between the access request and the access rule at the same abstraction level. Conversion of the access request or the access rule may be performed by the access control node or by another node, as discussed in greater detail below.

According to examples of the present disclosure, the computing device may be comprised within an IoT system, and the access rule may be applicable to the IoT system. In some examples, the access rule may be specific to the particular IoT system within which the computing device is comprised.

According to examples of the present disclosure, the computing device may be a constrained device. For the purposes of the present disclosure, a constrained device comprises a device which conforms to the definition set out in section 2.1 of IETF RFC 7228 for "constrained node". According to the definition in IETF RFC 7228, a constrained device is a device in which "some of the characteristics that are otherwise pretty much taken for granted for Internet nodes at the time of writing are not attainable, often due to cost constraints and/or physical constraints on characteristics such as size, weight, and available power and energy. The tight limits on power, memory, and processing resources lead to hard upper bounds on state, code space, and processing cycles, making optimization of energy and network bandwidth usage a dominating consideration in all design requirements. Also, some layer-2 services such as full connectivity and broadcast/multicast may be lacking". Constrained devices are thus clearly distinguished from server systems, desktop, laptop or tablet computers and powerful mobile devices such as smartphones. A constrained device may for example comprise a Machine Type Communication device, a battery powered device or any other device having the above discussed limitations. Examples of constrained devices may include sensors measuring temperature, humidity and gas content, for example within a room or while goods are transported and stored, motion sensors for controlling light bulbs, sensors measuring light that can be used to control shutters, heart rate monitors and other sensors for personal health (continuous monitoring of blood pressure etc.) actuators and connected electronic door locks. IoT devices may comprise examples of constrained devices.

FIGS. 2*a* and 2*b* show a flow chart illustrating process steps in a further example of method 200 for controlling access to resources of data objects exposed by at least one computing device, wherein the data objects conform to an object model that specifies, for a given object name of a data object, one or more resources which may be associated with instances of a data object of that object name. The method 200, as for the method 100, is performed by an access control node, which may be a physical or a virtual node as discussed above with reference to FIG. 1. The steps of the method 200 illustrate one example way in which the steps of the method 100 may be implemented and supplemented in order to achieve the above discussed and additional functionality.

Referring first to FIG. 2*a*, according to the method 200, in a first step 210, the access control node receives a request to access a resource of a data object instance, wherein the request to access a resource of the data object instance identifies the resource at an identification abstraction level that specifies how the resource may be accessed. As illustrated at step 210*a*, the request to access a resource of the data object instance may identify the resource using at least one of a URI of the resource, or an address of the computing device hosting the data object with which the resource is associated, and a path that points to the specific resource on the device. The resource is thus "pointed to" in some manner, using a URI or other addressing method.

In step 220, the access control node determines a compatibility of the request with an access rule, wherein the access rule specifies one or more limitations on access to resources at a semantic abstraction level that indicates a semantic content of a data object or resource.

FIG. 3 illustrates in further detail certain characteristics that may be exhibited by the access rule. Referring to FIG. 3, and as discussed above, an access rule 300 specifies one or more limitations on access to resources at a semantic abstraction level that indicates a semantic content of a data object or resource. As illustrated at 300*a*, the one or more limitations upon access to resources that are specified in the access rule 300 may identify a resource by the semantic content of its name or the name of the data object with which it is associated. Thus an access rule that specifies semantic content of a data object name may be considered to apply to all resources associated with that data object. In further examples, as illustrated at 300*b*, the one or more limitations upon access to resources that are specified in the access rule 300 may comprise a limitation that is conditional upon a characteristic of the access requested. Example characteristics may include "read" access requests, "write" access requests, "activate" access requests, etc. Thus an access rule may allow a certain type of "passive" access while preventing other types of "active" access, for example allowing reading of a thermostat value to know what temperature has been set, but preventing writing of the thermostat value to change the set temperature in a room.

As illustrated at 300*c*, the one or more limitations upon access to resources that are specified in the access rule 300 may comprise a limitation that is conditional upon a role of an entity from which the request to access a resource of a data object instance is received. A role may be assigned to an entity for example by an administrator of the system within which the computing device exposing the data objects and resources is deployed. In further examples, a role may be assigned to an entity by a computing device manufacturer or by a provider of a service which uses the computing device. In further examples, as illustrated at 300*d*, the one or more limitations upon access to resources that are specified in the access rule 300 may comprise a limitation that is conditional upon a value of at least one resource fulfilling a criterion. The resource to fulfil the criterion may be the resource being accessed or may be one or more other resources in the system. For example, permission to perform the action "unlock" on a door lock may be conditional upon a temperature resource inside a room accessed by the door exceeding a threshold value and on an alarm resource having a value "triggered".

Referring again to FIG. 2*a*, as illustrated a step 220*a*, the access control node determines a compatibility of the request with an access rule as discussed above using a mapping between the identification abstraction level and the semantic abstraction level.

FIG. 4 illustrates in further detail certain characteristics that may be exhibited by the mapping. Referring to FIG. 4, a mapping 400 between the identification abstraction level and the semantic abstraction level may reference the data model to which the data objects conform. The mapping may for example be based upon a system description of the system for which access is being controlled, and the data model or models to which data objects in the system conform. In this manner, for example, the mapping may be used to convert an access request identifying specific resources in the system to a semantic abstraction level which references the semantic content of the resources and actions identified in the request. Alternatively, the mapping may be used to convert a semantic access rule into one or more identification level rules which specify the individual resources and actions in the system to which the terms in the semantic rule apply. As illustrated at 400*a*, the mapping may comprise a mapping between a semantic term and at least one data object or resource the semantic content of which includes the semantic term. For example, the term "temperature" in the semantic level access rule "Administrators can read temperature values" may be mapped by the mapping 400 to the IPSO temperature object 3303, whose semantic information includes the term "temperature". In another example, the term "humidity" in the semantic level access rule "Assistants can read humidity values" may be mapped by the mapping 400 to the IPSO temperature object 3304, whose semantic information includes the term "humidity". In a further example, the term "camera" in the semantic level access rule "Administrators can view camera feeds from location X", may be mapped by the mapping 400 to the LwM2M camera object 10340.

As illustrated at 400*b*, the mapping may further comprise an association, such as a logical association, between the at least one data object or resource the semantic content of which includes the semantic term and another data item, such as a data object, resource or term, that is specified in an object model or ontology as being related to the at least one data object or resource the semantic content of which includes the semantic term. The relation between the at least one data object or resource and the other data item may comprise at least one of an equivalency relation (for example "same as"), an inclusion relation (for example "subset of") or a control relation (for example "in control of"). The other data item may comprise at least one of an object or resource specified in an object model or a term specified in an ontology. According to examples of the present disclosure, a data model or ontology may thus include relational information that associates data objects or resources. A data object or resource may thus be specified in a data model or ontology as being the same as another data object, resource or term, a subset of another data object, resource or term, in control of another data object, resource or term etc. The other data object, resource or term may be specified in the same data model or ontology or in a different data model or ontology or schema. In this manner, access rules specified at a semantic abstraction level may be applied across different object models, ontologies and schemas via a mapping that takes account of relational information between data objects, resources and terms specified in different object models, ontologies and schemas.

As illustrated at 400*c*, in examples in which the resource to which access is requested is comprised within a system, the mapping between the identification abstraction level and the semantic abstraction level may further comprise an association between at least one resource the semantic content of which includes the semantic term and another resource in the system that has been specified by a system administrator as being related to the at least one resource the semantic content of which includes the semantic term. Thus the mapping may incorporate resource relations that are specific to a particular system, as opposed to being specified in one or more object models.

As illustrated at 400*d*, the mapping may further comprise a mapping between a semantic term and at least one request type to which the semantic term corresponds. Thus for example the term "read" in the semantic rule "Administrators can read temperature values", may be mapped to a CoAP GET request type. The mapping may further comprise a mapping between a role and an identifier of at least one entity to which the role has been assigned, wherein the entity is operable to request access to a resource. The identifier may for example be an IP address and port. The role may be assigned to the entity by a system administrator, device manufacturer, service provider or other authority.

The mapping 400 provides a translation between a semantic abstraction level and an identification abstraction level. The identification abstraction level identifies data objects, resources, entities, access requests etc. at a concrete configuration level, using URIs, IP addresses, specified request types etc. The semantic abstraction level identifies data objects, resources, entities, access requests etc. by their semantic content. The expression of access rules at a semantic level is simpler, easier to debug, more flexible and allows for greater granularity than expression of access rules at an identification abstraction level. The mapping 400 enables a translation between the semantic level at which access control rules may be more efficiently expressed, and the identification abstraction level at which they may be implemented.

As discussed above with reference to FIG. 1, the mapping may be used to convert an access request to a semantic abstraction level, or convert an access rule to an identification abstraction level. FIG. 2b illustrates different examples of how the access control node may determine a compatibility of a received request for an access rule. Referring to FIG. 2b, the access control node may, in step 222, translate the received request to access a resource of a data object instance to the semantic abstraction level using the mapping, and compare the translated request to the access rule. In such an example, a comparison between access request and access rule is made at the semantic abstraction level. In other examples, the access control node may, at step 224, obtain a translation of the access rule into the identification abstraction level, the translation being generated using the mapping, and compare the received request to the translated access rule. In such examples, a comparison between access request and access rule is made at the identification abstraction level.

As illustrated at step 224, obtaining a translation of the access rule into the identification abstraction level, wherein the translation is generated using the mapping, may comprise translating the access rule into the identification abstraction level using the mapping, or receiving, from an access policy node, a translation of the access rule into the identification abstraction level, wherein the translation has been generated by the access policy node using the mapping. The access policy node may comprise a physical or virtual node, and may for example act as a policy database, receiving and storing semantic level access rules that are to be applied by one or more access control nodes. The access policy node may supply the one or more access control nodes with access rules that are expressed at the semantic abstraction level, or may translate semantic access rules to the identification abstraction level, and supply the translated access rules to the one or more access control nodes. Actions at an access policy node are discussed in greater detail below, with reference to FIGS. 5 and 6.

Referring again to FIG. 2a, after determining a compatibility of the received request to access a resource with an access rule, the access control node then allows the request in step 230a if the request is compatible with the rule, or denies the request in step 230b, if the request is not compatible with the rule. Allowing or denying the request may comprise forwarding or not forwarding the request to the requested resource.

FIG. 5 is a flow chart illustrating process steps in a method 500 for managing access rules for controlling access to resources of data objects hosted on at least one computing device. The data objects conform to an object model that specifies, for a given object name of a data object, one or more resources which may be associated with instances of a data object of that object name. The method 500 is performed by an access policy node, which may be a physical node or a virtual node running in a cloud, edge cloud or fog deployment. The access policy node may for example be a component part of an Intrusion Prevention System. Referring to FIG. 5, the method 500 comprises, in a first step 510, receiving configuration information defining an access rule, and, in a second step 520, storing the access rule in a memory. As illustrated at 510, the access rule specifies one or more limitations upon access to resources at a semantic abstraction level that indicates a semantic content of a data object or resource.

FIG. 6 is a flow chart illustrating process steps in a further example of method 600 for managing access rules for controlling access to resources of data objects hosted on at least one computing device, wherein the data objects conform to an object model that specifies, for a given object name of a data object, one or more resources which may be associated with instances of a data object of that object name. The method 600, as for the method 500, is performed by an access policy node, which may be a physical or a virtual node as discussed above with reference to FIG. 5. The steps of the method 600 illustrate one example way in which the steps of the method 500 may be implemented and supplemented in order to achieve the above discussed and additional functionality.

Referring to FIG. 6, according to the method 600, in a first step 610, the access policy node receives configuration information defining an access rule. As illustrated at step 610, the access rule specifies one or more limitations upon access to resources at a semantic abstraction level that indicates a semantic content of a data object or resource. The access control rule may exhibit any one or more of the characteristics discussed above with reference to FIG. 3. In step 620, the access policy node stored the access rule in a memory.

In step 630, the access policy node may translate the access rule into an identification abstraction level that specifies how the resource may be accessed, wherein translating comprises using a mapping between the identification abstraction level and the semantic abstraction level. The mapping may comprise a mapping as discussed above with reference to FIG. 4. As discussed above, specifying, in the identification abstraction level, how a resource may be accessed may include specifying a URI of the resource or an IP address and port for the computing device hosting the data object with which the resource is associated and a path that points to the specific resource on the device. The translated access rule may also be stored in a memory. In step 640, the access policy node may provide the stored access rule to an access control node. The access rule may be provided to the access control node expressed at the semantic abstraction level or the identification abstraction level.

Figure 7:
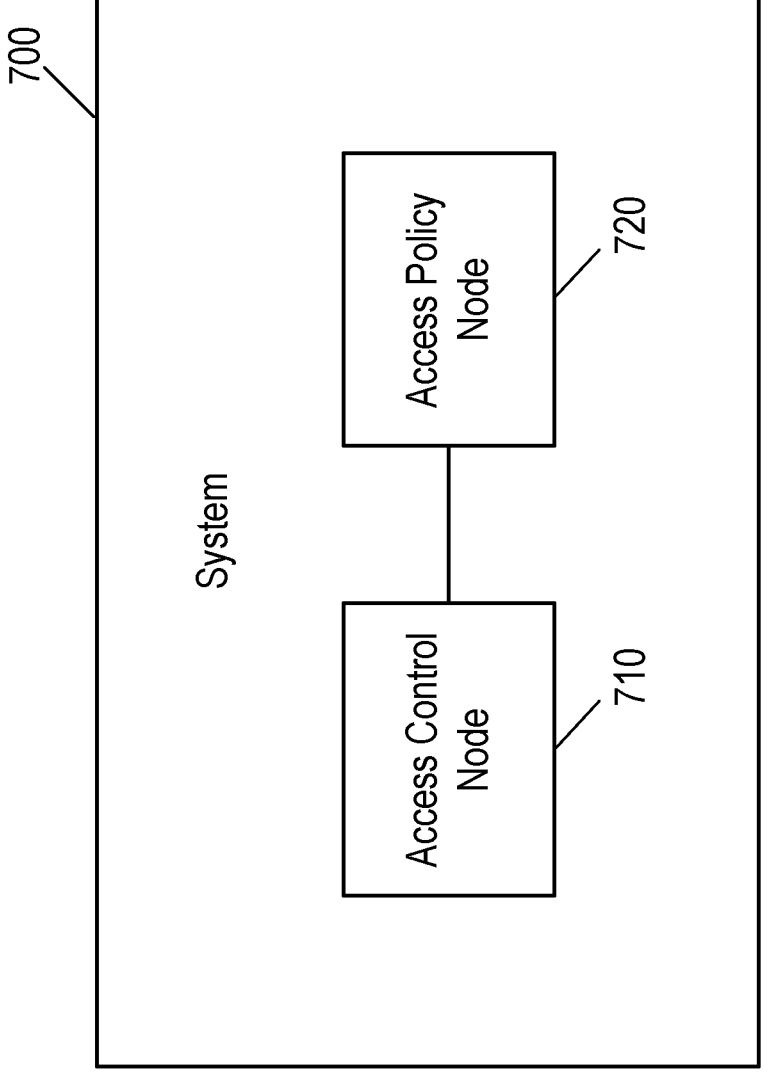
FIG. 7 illustrates a system for Intrusion prevention.

As discussed above, an access control node and an access policy node may each comprise component parts of an Intrusion Prevention System (IPS), such as the system 700 illustrated in FIG. 7. The access control node 710 and access policy node 720 may each perform some or all of the steps described above with reference to FIGS. 1 to 6. In some examples, the system 700 may comprise a plurality of access control nodes 710, each access control node deployed to control access to a specific system or subsystem. The access control nodes may intercept traffic addressed to resources within the specific system or subsystem, to control access to those resources. The system 700 may comprise one or more access policy nodes 720, which may for example be virtual nodes running in a cloud deployment, and acting as a central policy reserve for the access control nodes 710. In further examples of the system 700, the access control node 710 and access policy node 120 may be deployed in the same physical or virtual node. In such examples the functionality of the nodes may remain separate, or their functionality may be executed by a single combined logical entity.

As discussed above with reference to FIG. 4, some examples of the present disclosure may exploit relational information between data objects or resources, which relational information may be specified in an object model. Examples of the present disclosure also propose an object model node, which may identify such associations and update data models to reflect them.

FIG. 8 is a flow chart illustrating process steps in a method 800 for maintaining an object model that specifies, for a given object name of a data object, one or more resources which may be associated with instances of a data object of that object name. The method 800 is performed by an object model node, which may be a physical node or a virtual node running in a cloud, edge cloud or fog deployment. Referring to FIG. 8, the method 800 comprises, in a first step 810, extracting semantic content of a data object or resource in the object model, and, in step 820, identifying a data item that is specified in an object model or ontology and comprises semantic content that matches the extracted semantic content. The method 800 further comprises, in step 830, identifying a relation between the identified data item and the data object or resource in the object model, and, in step 840, updating the data model to specify a relation between the identified data item and the data object or resource.

As illustrated at 830a, the relation between the identified data item and the data object or resource may comprise at least one of an equivalency relation, an inclusion relation or a control relation. The other data item that comprises semantic content that matches the extracted semantic content may comprise at least one of an object or resource specified in an object model or a term specified in an ontology. The object model of the other data item may be the object model that is maintained by the object model node or a different object model.

The nodes and methods discussed above may be deployed in any networked system comprising computing devices that expose resources. In addition, the methods may be used in connection with any object model that specifies, for a given object name of a data object, one or more resources which may be associated with instances of a data object of that object name. There now follows a discussion of an example Intrusion Protection System, comprising an access control node and a policy control node. The example system controls access to resources confirming to the IPSO Smart Objects and LwM2M object models, and is referred to below as an IPSO Intrusion Prevention System (IIPS).

Figure 9:
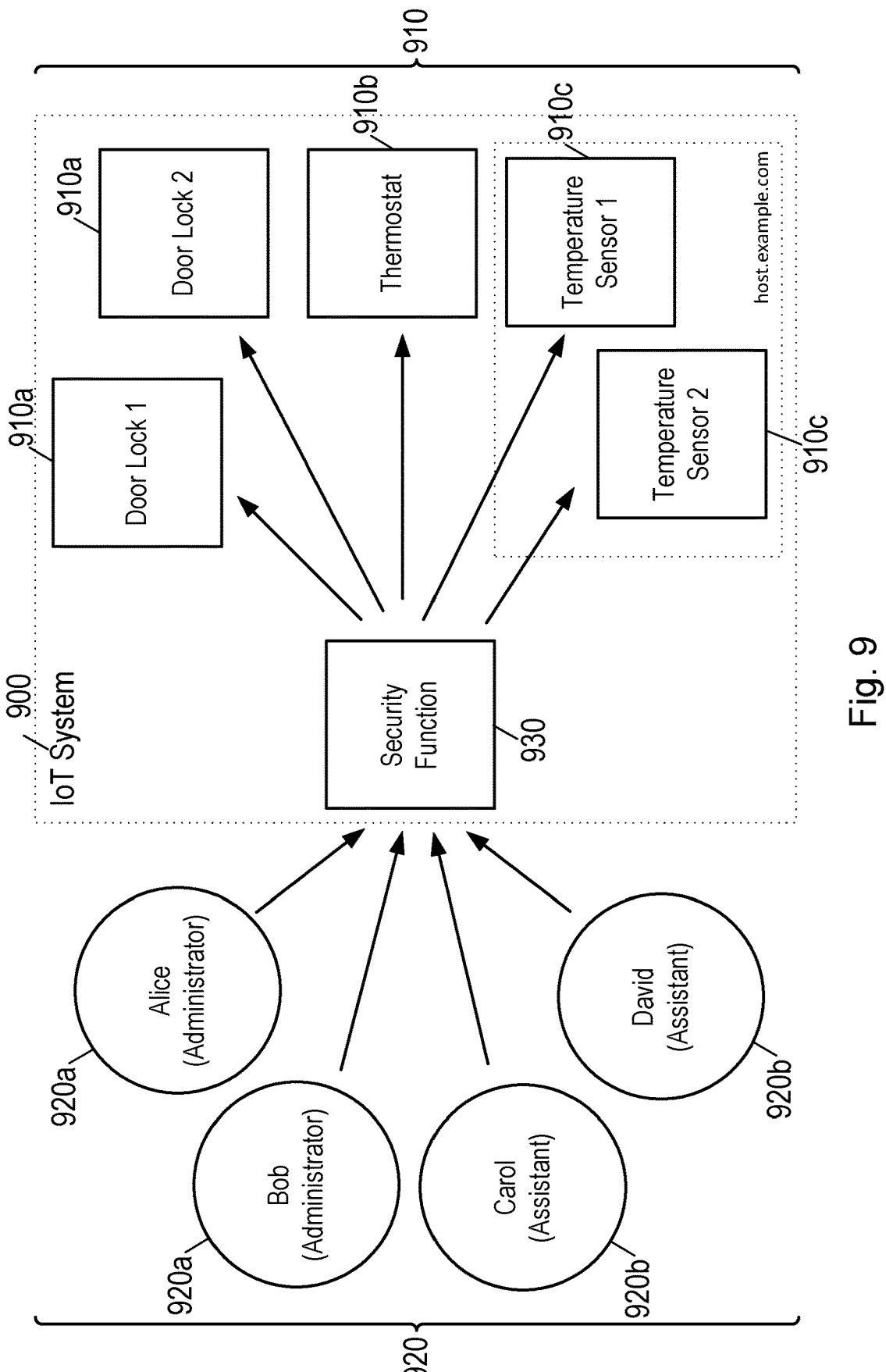
FIG. 9 illustrates an IoT system.

FIG. 9 shows an example IoT system 900 with its data objects hosted on computing devices 910 and users 920. The IoT system includes data objects of three types: two door locks 910A, a thermostat 910B, and two temperature sensors 910C. Both temperature sensors have been deployed on the same host (host.example.com). The system has four users: two administrators 920A and two assistants 920B. Access to the system 900 is controlled by a security function 930. The illustrated system includes human users however it will be appreciated that users may include machines or other entities. For example computing devices in an IoT deployment may seek to read, control or otherwise access resources hosted on other computing devices, for example under an automated control system.

If the security function 930 is implemented using a firewall, the firewall needs to be explicitly configured with the IP addresses of all users and the IP addresses of the host devices with resources. The firewall must be re-configured every time any of those IP addresses changes. In addition, while the rules at the firewall can block a given user (for example Carol) from accessing a given set of resources, they cannot prevent a user from accessing a given resource in a certain way (for example to check whether or not a door is locked) while allowing the same user to access the same resource in a different way (for example unlocking the door).

The security function 930 could also be implemented using an IPS with support for role-based authentication. Such an IPS could be configured to allow all users with a given role (for example, all administrators) to access certain resources. However, such an IPS would still have to configure access for individual resources separately, and would not be able to allow users to access a resource in only certain ways but not in other ways. The IPS would also not be able to restrict access to resources in more granular ways (for example ensuring assistants cannot read the temperature of a sensor unless the temperature is above a certain threshold) or more complex ways (for example assistants cannot unlock a door unless the temperature inside the room has surpassed the threshold and an alarm has been triggered).

The above limitations of a firewall and standard IPS can be addressed by implementing the security function as an IIPS, capable of handling semantic rules and comprising an access control node and access policy node as discussed in the present disclosure.

An IIPS inspects the objects in the packets that it processes in order to be forwarded or rejected according to its policy rules. An IIPS therefore terminates transport-layer security. It will be appreciated that object security with integrity protection can still be used end-to-end, even with packet inspection performed by the IIPS. The IIPS checks what command is being attempted in an access request and what IPSO/LwM2M objects are involved. The IIPS compares the command, endpoint identifiers, and objects/resources to the policy rules installed at the IIPS. If the action is allowed according to the policy rules, the command is forwarded to the LwM2M client. If the action is not allowed, the command is not forwarded and an event is optionally logged (as a potential attack).

The definition of IPSO objects is standardized, and instances of a given object use the standardized definition. IPSO objects and reusable resources have the same semantics independent of where they are used, meaning the same semantic rules can be applied across devices and systems. According to a current version of the IPSO standard, different objects from the same domain (for example, temperature control) or realm of control (for example objects that are lower in a hierarchy than a target object, and so in principle may be controlled by any entity that has authority to control the target abject) must be individually specified at the time they are standardized. That is, it must be specified at the time the object is being standardized that each object belongs to a particular domain or control realm. Examples of the present disclosure propose to automate this process by extending the IPSO object model, and other object schema, with semantic and control relation information. It is proposed that a new field in such schema contain a set of relation statements. Such statements may include:

"same-as" relation listing objects having (practically) identical semantics,

"subset-of" relation listing objects of which the specified object has a subset of functionalities, and "in-control-of" relation listing objects that the specified object has control over, etc.

These relations can be used to automate access rules between objects.

The "same-as" relation extension lists the object ID of the object or objects it shares semantics with. Additionally, the "same-as" extension may refer to terms in external ontologies (for example, using the URI syntax as is common with semantic web technologies). In such examples, two objects referring to the same term, or terms having a "same-as" relation between two ontologies, would be considered equal from semantic point of view for IIPS rules. In a similar manner, the "subset-of" and "in-control-of" extensions could refer to other objects by their ID or external ontology, with similar rules to those for the "same-as" extension for matching semantics.

To provide even more flexibility, the administrator of an IoT system may define relations among objects similar to those discussed above but applicable only to a particular IoT system. In such examples, the administrator of the IoT system would define these relations using resources, and the relations would not be included in the standardized definition of the objects. The relational information for the resources may be the same as that discussed above for data objects (same-as, subset-of, and in-control-of relation information).

The following examples illustrate how an access request expressed on an identification abstraction level may be controlled using rules expressed at a semantic abstraction level, as well as demonstrating the simplicity, ease and flexibility afforded by expressing rules at the semantic abstraction level. The examples refer to the system 900 illustrated in FIG. 9.

Example 1

The CoAP protocol uses the URI path to encode an IPSO object and resource being accessed. The following command reads the temperature at temperature sensor 1 in the example system:

GET coap://host.example.com/3303/1/5700

"coap" is the scheme component of the URI and provides the name of the protocol used by the device associated with the resource.

"host.example.com" is the authority component of the URI and may in some cases comprise the IP address and port number of the device associated with the resource.

"/3303/1/5700" is the path component of the URI and indicates the specific resource of the device.

Within the path component:

"3303" is the IPSO identifier of the thermometer object,

"1" is the instance of the object (in the example in FIG. 9, there are two instances of the thermometer object), and "5700" is the resource that gives access to the temperature as measured by the thermometer (i.e., the sensor value).

In order to allow "administrator" users to read the temperature at all the temperature sensors in the system in FIG. 9, we would need to set up rules at the IIPS. A typical rule using the path components, and thus expressed at an identification abstraction level, would look as follows.

Allow GET requests from "Administrator" users to path: coap://host.example.com/3303/*/5700 where * is a wildcard that matches both temperature sensors in the system (1 and 2).

According to examples of the present disclosure, an access rule expressed at a semantic level of abstraction does not refer to the path components but uses the object and/or resource semantics instead. The semantic rule would look as follows:

Allow "Administrator" users to read temperature values:

In this example, the addresses of the temperature resources are mapped to information from their semantic descriptions ("temperature values"), and the specific request type (GET) is mapped to a semantic description of the access that is requested ("read"). The rule has thus been translated from the identification abstraction level to the semantic abstraction level.

In the simple example above with only two temperature sensors, the identification level rule is not too complicated, and the semantic rule therefore offers only a minor reduction in complexity. However, in a realistic IoT system with many different types of temperature-related objects (such as may be deployed for a smart factory or processing plant, or in a smart building), the identification or path level rules quickly become highly complex and difficult to debug. In contrast, the semantic level rule is unaffected by the complexity of the system to which it is controlling access, and remains in the simple form set out above.

Example 2

The following command sets the temperature to "42" at the thermostat (3308) object:

Request: PUT coap://host.example.com/3308/0/5900

Payload: 42 where:

"3308" is the IPSO identifier of the thermometer object,

"0" is the instance of the object (in the example in FIG. 9, there is only one instance of the thermostat object), and "5900" is the resource that gives access to the temperature set by the thermostat.

In order to allow "administrator" users to set the temperature at the thermostat, a typical rule using the path components, and thus expressed at an identification abstraction level, would look as follows.

Allow PUT requests from "Administrator" users to path: coap://host.example.com/3308/0/5900

According to examples of the present disclosure, an access rule at expressed at a semantic level of abstraction does not refer to the path components but uses the object and/or resource semantics instead. The semantic rule would look as follows:

Allow "Administrator" users to set thermostat temperature:

If the system 900 in FIG. 9 were extended to include another object "room thermostat", then the identification or path level rule would have to be amended to add the URI for the new object resource. However, according to examples of the present disclosure, if the thermostat object definition is extended with relation information, and another object "room thermostat" is defined with relation "same-as" to the thermostat object, the rules applied to generic thermostat object could be automatically extended to the room thermostat object.

The LwM2M XML schema extension in the "room thermostat" object definition could look as follows:

```
<Same-as>
<Object>3308</Object>
<Term>http://iotschema.org/Thermostat</Term>
</Same-as>
```

This extension refers to the generic thermostat object ID (3308) and also the term "Thermostat" in the standard iotschema ontology, ensuring that rules can be applied across both the IPSO and LwM2M object models and the IoT schema ontology.

For the purposes of the present example, it is assumed that the new "room thermostat" object has object ID 6608. A further new Object, "room corner thermostat" may then be defined, and may have the following information about the relation to other objects and terms:

```
<Subset-of>
<Object>6608</Object>
</Subset-of>
<Same-as>
<Term>http://iotschema.org/Thermostat</Term>
</Same-as>
```

This information may be used by the IIPS to translate or convert a semantic level rule into a plurality of identification or path level rules. This conversion may be based on the information that the "room corner thermostat" objects is still a "thermostat" object (based on the "same-as" information) even if it has different ID to that of the generic thermostat object. The conversion may also be based on the information that the "room corner thermostat" is a more specific version of the "room thermostat" object (based on the "subset-of" information).

The conversion between semantic level rules and identification or path level rules may be performed when a rule is configured at the IIPS or ad-hoc, as an access request is received. The comparison between access request and rule may take place on the identification or path level or on the semantic level.

In an example in which a comparison takes place on the identification or path abstraction level, the IIPS may automatically translate each semantic rule into one or more identification level rules as each rule is configured. The translation may be updated each time the IoT system to which access is being controlled is changed. For example, if the rule "Administrator can read and write any value, except open lock" is configured at the IIPS, the IIPS may use the semantic information from the IPSO objects and translates the rule into allowing CoAP GET requests from Administrator roles to any URI, and allowing CoAP PUT requests from Administrator roles to any URI except to URIs with the door lock object ID. In another example, the rule "Carol can control temperature and lock 1" would result in allowing CoAP GET and PUT requests from Carol's IP address to lock, thermostat, and temperature sensor object IDs.

As discussed above, the methods 100, 200, 500, 600 and 800 are performed by an access control node, an access policy node and an object model node respectively.

The present disclosure provides an access control node, an access policy node and an object model node which are adapted to perform any or all of the steps of the above discussed methods. The access control node and access policy node may comprise component parts of an IPSO Intrusion Prevention System.

Figure 12:
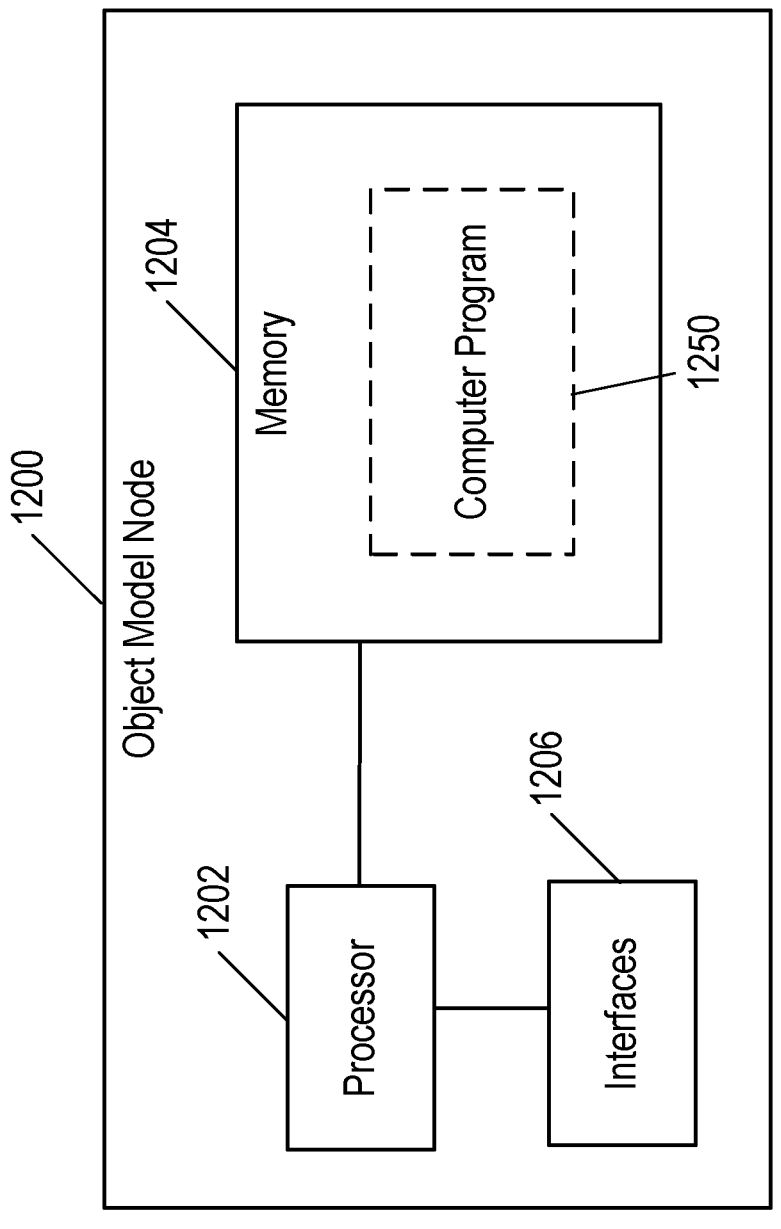
FIG. 12 is a block diagram illustrating functional modules in an object model node.

FIG. 12 is a block diagram illustrating a storage node 1200 which may implement the method 300 and/or 400 according to examples of the present disclosure, for example on receipt of suitable instructions from a computer program 1250. Referring to FIG. 12, the storage node 1200 comprises a processor or processing circuitry 1202, and may comprise a memory 1204 and interfaces 1206. The processing circuitry 1202 is operable to perform some or all of the steps of the method 300 and/or 400 as discussed above with reference to FIGS. 3 and 4. The memory 1204 may contain instructions executable by the processing circuitry 1202 such that the storage node 1200 is operable to perform some or all of the steps of the method 300 and/or 400. The instructions may also include instructions for executing one or more telecommunications and/or data communications protocols. The instructions may be stored in the form of the computer program 1250.

Figures 10, 11:
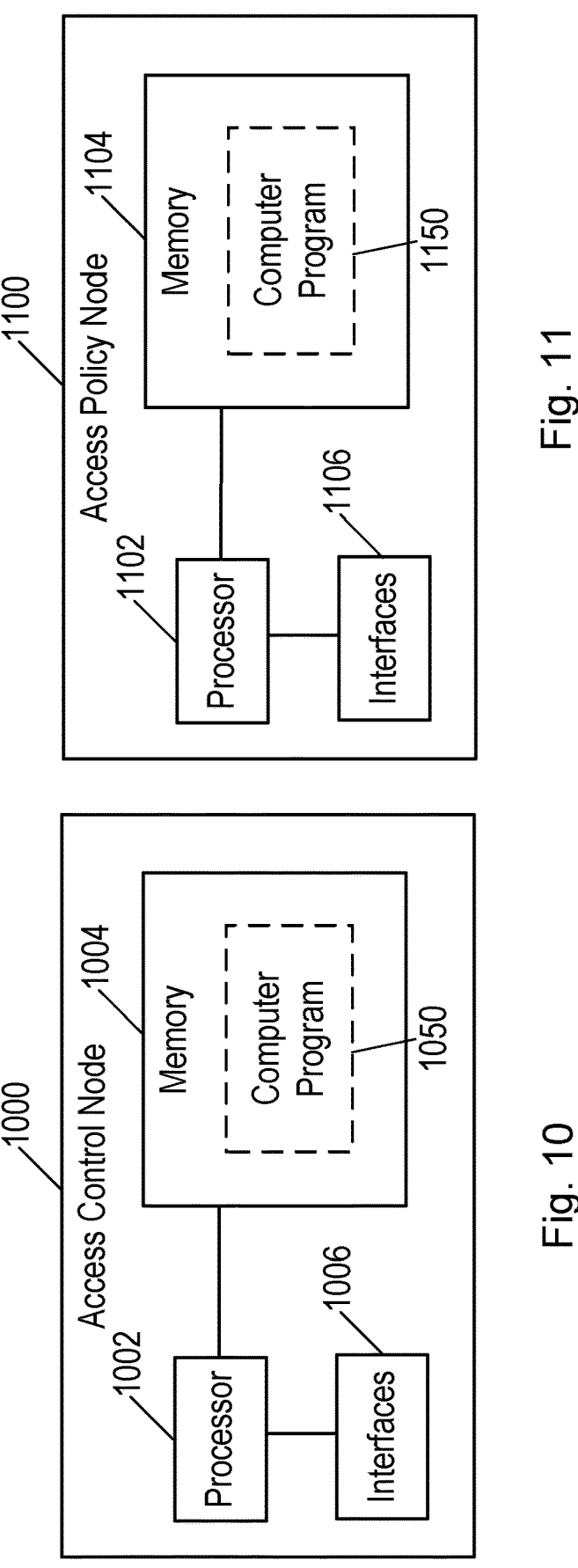
FIG. 10 is a block diagram illustrating functional modules in an access control node.
FIG. 11 is a block diagram illustrating functional modules in an access policy node.

FIG. 10 is a block diagram illustrating an access control node 1000 which may implement the method 100 and/or 200 according to examples of the present disclosure, for example on receipt of suitable instructions from a computer program 1050. Referring to FIG. 10, the access control node 1000 comprises a processor or processing circuitry 1002, and may comprise a memory 1004 and interfaces 1006. The processing circuitry 1002 is operable to perform some or all of the steps of the method 100 and/or 200 as discussed above with reference to FIGS. 1 and 2. The memory 1004 may contain instructions executable by the processing circuitry 1002 such that the access control node 1000 is operable to perform some or all of the steps of the method 100 and/or 200. The instructions may also include instructions for executing one or more telecommunications and/or data communications protocols. The instructions may be stored in the form of the computer program 1050.

FIG. 11 is a block diagram illustrating an access policy node 1100 which may implement the method 500 and/or 600 according to examples of the present disclosure, for example on receipt of suitable instructions from a computer program 1150. Referring to FIG. 11, the access policy node 1100 comprises a processor or processing circuitry 1102, and may comprise a memory 1104 and interfaces 1106. The processing circuitry 1102 is operable to perform some or all of the steps of the method 500 and/or 600 as discussed above with reference to FIGS. 5 and 6. The memory 1104 may contain instructions executable by the processing circuitry 1102 such that the access policy node 1100 is operable to perform some or all of the steps of the method 500 and/or 600. The instructions may also include instructions for executing one or more telecommunications and/or data communications protocols. The instructions may be stored in the form of the computer program 1150.

FIG. 12 is a block diagram illustrating an object model node 1200 which may implement the method 800 according to examples of the present disclosure, for example on receipt of suitable instructions from a computer program 1250. Referring to FIG. 12, the object model node 1200 comprises a processor or processing circuitry 1202, and may comprise a memory 1204 and interfaces 1206. The processing circuitry 1202 is operable to perform some or all of the steps of the method 800 as discussed above with reference to FIG. 8. The memory 1204 may contain instructions executable by the processing circuitry 1202 such that the object model node 1200 is operable to perform some or all of the steps of the method 800. The instructions may also include instructions for executing one or more telecommunications and/or data communications protocols. The instructions may be stored in the form of the computer program 1250.

In some examples, the processor or processing circuitry 1002, 1102, 1202 described above may include one or more microprocessors or microcontrollers, as well as other digital hardware, which may include digital signal processors (DSPs), special-purpose digital logic, etc. The processor or processing circuitry 1002, 1102, 1202 may be implemented by any type of integrated circuit, such as an Application Specific Integrated Circuit (ASIC), Field Programmable Gate Array (FPGA) etc. The memory 1004, 1104, 1204 may include one or several types of memory suitable for the processor, such as read-only memory (ROM), random-access memory, cache memory, flash memory devices, optical storage devices, solid state disk, hard disk drive etc.

Examples of the present disclosure provide nodes and methods that may be performed by such nodes that enable the implementation and enforcement of standardized policy control for systems including IoT systems. The semantic level access rules enabled by examples of the present disclosure go beyond what current DPI-based IPSs and role-based authentication systems are capable of expressing, being both more flexible and more specific. In particular, semantic level rules are able to take into account not only the identity and role of the originator but also the actions allowed to be performed on a given destination resource of a given type. Semantic rules are also easier to set, understand, and debug and may be applied to systems employing different object models or ontologies.

It will be appreciated that examples of the present disclosure may be virtualised, such that the methods and processes described herein may be run in a cloud environment.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. An access control node for controlling access to resources of data objects exposed by at least one computing device, wherein the data objects conform to an object model that specifies, for a given object name of a data object, one or more resources which may be associated with instances of a data object of that object name, the access control node comprising processing circuitry configured to:

receive an access request to access a resource of a data object instance;

determine a compatibility of the access request with an access rule; and perform at least one of allowing or denying the access request in accordance with the determined compatibility, wherein the access request identifies the resource at an identification abstraction level, the access request comprises an object type identifier identifying an object type, an instance identifier identifying one or more instances of the object type, and a resource identifier identifying the resource, the access rule specifies one or more limitations on access to resources at a semantic abstraction level that indicates a semantic content of a data object or resource, the one or more limitations comprising a limitation that is conditional upon a value of at least one resource fulfilling a criterion, and determining the compatibility of the access request with the access rule comprises using a mapping between the identification abstraction level and the semantic abstraction level.

2. The access control node of claim 1, wherein the semantic content of data objects and resources is defined by the object model to which they conform, and wherein the mapping between the identification abstraction level and the semantic abstraction level references the data model to which the data objects conform.

3. The access control node of claim 1, wherein the one or more limitations upon access to resources that are specified in the access rule identify a resource by the semantic content of its name or the name of the data object with which it is associated.

4. The access control node of claim 1, wherein the one or more limitations upon access to resources that are specified in the access rule comprises a limitation that is conditional upon a characteristic of the access requested.

5. The access control node of claim 1, wherein the one or more limitations upon access to resources that are specified in the access rule comprises a limitation that is conditional upon a role of an entity from which the access request to access a resource of a data object instance is received.

6. The access control node of claim 1, wherein the access request to access the resource of the data object instance identifies the resource using at least one of a Unique Resource Identifier, URI, or an address of the computing device hosting the data object with which the resource is associated and a path that points to the specific resource on the device.

7. The access control node of claim 1, wherein the processing circuitry is configured to determine a compatibility of the access request with an access rule using the mapping between the identification and semantic abstraction levels by performing at least one of:

translating the received access request to access a resource of a data object instance to the semantic abstraction level using the mapping and comparing the translated access request to the access rule; and obtaining a translation of the access rule into the identification abstraction level, wherein the translation is generated using the mapping, and comparing the received access request to the translated access rule.

8. The access control node of claim 7, wherein the processing circuitry is configured to obtain a translation of the access rule into the identification abstraction level, wherein the translation is generated using the mapping, by performing at least one of:

translating the access rule into the identification abstraction level using the mapping; and receiving, from an access policy node, a translation of the access rule into the identification abstraction level, wherein the translation has been generated by the access policy node using the mapping.

9. An intrusion prevention system comprising:

the access control node of claim 1; and an access policy node for managing access rules for controlling access to resources of data objects hosted on at least one computing device, wherein the data objects conform to an object model that specifies, for a given object name of a data object, one or more resources which may be associated with instances of a data object of that object name, the access policy node comprising processing circuitry configured to:

receive configuration information defining an access rule; and store the access rule in a memory, wherein the access rule specifies one or more limitations upon access to resources at a semantic abstraction level that indicates a semantic content of a data object or resource.

10. An access control node for controlling access to resources of data objects exposed by at least one computing device, wherein the data objects conform to an object model that specifies, for a given object name of a data object, one or more resources which may be associated with instances of a data object of that object name, the access control node comprising processing circuitry configured to:

receive an access request to access a resource of a data object instance;

determine a compatibility of the access request with an access rule; and perform at least one of allowing or denying the access request in accordance with the determined compatibility, wherein the access request identifies the resource at an identification abstraction level, the access request comprises an object type identifier identifying an object type, an instance identifier identifying one or more instances of the object type, and a resource identifier identifying the resource, the access rule specifies one or more limitations on access to resources at a semantic abstraction level that indicates a semantic content of a data object or resource, the one or more limitations comprising a limitation that is conditional upon a value of at least one resource fulfilling a criterion, determining the compatibility of the access request with the access rule comprises using a mapping between the identification abstraction level and the semantic abstraction level, and the mapping between the identification abstraction level and the semantic abstraction level comprises a mapping between a semantic term and at least one data object or resource the semantic content of which includes the semantic term.

11. The access control node of claim 10, wherein the mapping between the identification abstraction level and the semantic abstraction level further comprises an association between the at least one data object or resource the semantic content of which includes the semantic term and another data item that is specified in an object model or ontology as being related to the at least one data object or resource the semantic content of which includes the semantic term.

12. The access control node of claim 11, wherein the relation between the at least one data object or resource the semantic content of which includes the semantic term and the other data item comprises at least one of an equivalency relation, an inclusion relation or a control relation.

13. The access control node of claim 11, wherein the other data item comprises at least one of an object or resource specified in an object model or a term specified in an ontology.

14. The access control node of claim 10, wherein the resource to which access is requested is comprised within a system, and wherein the mapping between the identification abstraction level and the semantic abstraction level further comprises an association between at least one resource the semantic content of which includes the semantic term and another resource in the system that has been specified by a system administrator as being related to the at least one resource the semantic content of which includes the semantic term.

15. The access control node of claim 10, wherein the mapping between the identification abstraction level and the semantic abstraction level further comprises a mapping between a semantic term and at least one request type to which the semantic term corresponds.

16. The access control node of claim 10, wherein the mapping between the identification abstraction level and the semantic abstraction level further comprises a mapping between a role and an identifier of at least one entity to which the role has been assigned, wherein the entity is operable to request access to a resource.

17. An object model node for maintaining an object model that specifies, for a given object name of a data object, one or more resources which may be associated with instances of a data object of that object name, the object model node comprising processing circuitry configured to:

extract semantic content of a data object or resource in the object model, wherein the extracted semantic content comprises a semantic term;

identify a data item that is specified in an object model or ontology and comprises semantic content that matches the extracted semantic content;

identify a relation between the identified data item and the data object or resource in the object model; and update the data model to specify a relation between the identified data item and the data object or resource, wherein the relation between the identified data item and the data object or resource comprises:

(i) an equivalency relation indicating the identified data item and the data object or resource have identical semantics, (ii) an inclusion relation indicating (a) a subset of functionalities of the data object or resource comprises the identified data item or (b) a subset of functionalities of the identified data item comprises the data object or resource, and/or (iii) a control relation indicating (a) the data object or resource has control over the identified data item or (b) the identified data item has control over the data object or resource.

18. The object model node of claim 17, wherein the other data item comprises at least one of an object or resource specified in an object model or a term specified in an ontology.

19. The intrusion prevention system of claim 9, wherein the access policy node is further configured to provide the stored access rule to the access control node.

* * * * *